(12) United States Patent
Stark (10) Patent No.: US 8,052,062 B2
(45) Date of Patent: Nov. 8, 2011

(54) CONSTANT AIR VOLUME / VARIABLE AIR TEMPERATURE ZONE TEMPERATURE AND HUMIDITY CONTROL SYSTEM

(76) Inventor: Walter Stark, Huntington, NY (US)

( * ) Notice: Subject to any disclaimer, the term of this patent is extended or adjusted under 35 U.S.C. 154(b) by 0 days.

(21) Appl. No.: 12/803,676

(22) Filed: Jul. 1, 2010

(65) Prior Publication Data

US 2010/0320277 A1    Dec. 23, 2010

Related U.S. Application Data

(63) Continuation-in-part of application No. 12/005,452, filed on Dec. 27, 2007, now Pat. No. 7,810,738.

(51) Int. Cl.
*F24F 7/06* (2006.01)
*F24F 7/08* (2006.01)

(52) U.S. Cl. ......... 236/1 B; 236/49.3; 165/212; 700/277

(58) Field of Classification Search .................. 236/1 B, 236/44 C, 49.3; 165/205, 212; 62/186; 700/277
See application file for complete search history.

(56) References Cited

U.S. PATENT DOCUMENTS

| | | | |
|---|---|---|---|
| 6,196,469 B1 * | 3/2001 | Pearson | 236/49.3 |
| 6,604,688 B2 * | 8/2003 | Ganesh et al. | 236/49.3 |
| 6,789,618 B2 | 9/2004 | Pearson | |
| 6,792,766 B2 | 9/2004 | Osborne | |
| 7,810,738 B2 | 10/2010 | Stark | |
| 2007/0145158 A1 * | 6/2007 | Dietz et al. | 236/1 B |

* cited by examiner

*Primary Examiner* — Marc Norman
(74) *Attorney, Agent, or Firm* — Alfred M. Walker

(57) ABSTRACT

A method for providing energy-efficient temperature and humidity control with uniform ventilation air distribution in a constant-volume zoned heating and cooling systems. The method utilizes an air-to-air heat exchanger that regulates the temperature of the supply air to a space, using the temperature differential between supply air and return (room) air and regulating the flow of return air through the heat exchanger.

6 Claims, 11 Drawing Sheets

| FIGURE 4 - CAVVAT COMBINATIONS ||||||
|---|---|---|---|---|---|
| FIGURE | SYSTEM TYPE | MODULATION MEANS | HEAT EXCHANGER IN | EXCESS AIR ROUTE TO RETURN | HEAT EXCHANGER OUT |
| 1 | ZONE FACE & BYPASS RELIEF | FACE DAMPERS + BYPASS RELIEF DAMPERS | DIRECT OR FREE | DIRECT OR FREE | DIRECT |
| 1a | ZONE FACE & BYPASS RELIEF | FACE DAMPERS + BYPASS RELIEF DAMPER | DIRECT OR FREE | DIRECT OR FREE | DIRECT |
| 2 PRIOR ART | ZONE FACE & BYPASS | FACE DAMPER + BYPASS DAMPER | DIRECT | DIRECT | DIRECT |
| 3 | ZONE FAN | ZONE FANS | FREE | FREE | DIRECT |
|  |  |  | DIRECT | DIRECT | FREE OR DIRECT |
| 3a | ZONE FAN | ZONE FANS | DIRECT OR FREE | FREE | DIRECT |
| 3b | ZONE FAN | ZONE FANS + ZONE BYPASS RELIEF DAMPERS | DIRECT OR FREE | DIRECT OR FREE | DIRECT |
| 3c | ZONE FAN | ZONE FANS + SYSTEM FACE DAMPER + SYSTEM BYPASS RELIEF DAMPER | DIRECT OR FREE | DIRECT OR FREE | DIRECT |
| 3d | ZONE FAN | ZONE FANS + ZONE FACE DAMPER + ZONE BYPASS RELIEF DAMPERS | DIRECT OR FREE | FREE | DIRECT |
| 3e | ZONE FAN | ZONE FANS + ZONE FACE DAMPERS + SYSTEM BYPASS DAMPER | DIRECT | FREE | DIRECT |

FIGURE 5 – CONTROL LOOP

CONSTANT AIR VOLUME / VARIABLE AIR TEMPERATURE ZONE TEMPERATURE AND HUMIDITY CONTROL SYSTEM

RELATED APPLICATIONS

This application is a continuation-in-part of application Ser. No. 12/005,452, filed Dec. 27, 2007, now U.S. Pat. No. 7,810,738 which application is incorporated by reference herein. Applicant claims priority under 35 U.S.C. 120 therefrom.

FIELD OF THE INVENTION

The present invention relates maintaining accurate temperature and humidity control in a multi-zone building with varying cooling and heating loads while maintaining an efficient continuous and fixed supply of total air and ventilation.

BACKGROUND OF THE INVENTION

Heating, ventilating and air conditioning (HVAC) systems serving multiple zones are classified according to the methods used to control the temperature and humidity in each zone. An early HVAC system commonly known as terminal reheat zone control was known to have superior space temperature and humidity control capability, but it was also known for consuming large amounts of energy in the cooling mode caused by the reheating process.

Another development in zone control came in the form of variable air volume (VAV) systems that regulate the supply air volume to a space in response to temperature requirement. These VAV systems, although good at controlling temperature, cannot ensure that the proper mixture of ventilation air reaches a room or zone because the total air volume varies with temperature needs. It is therefore not uncommon for the supply air volume to be low at a time of high occupancy, when a greater need for ventilation exists.

Figure 2:
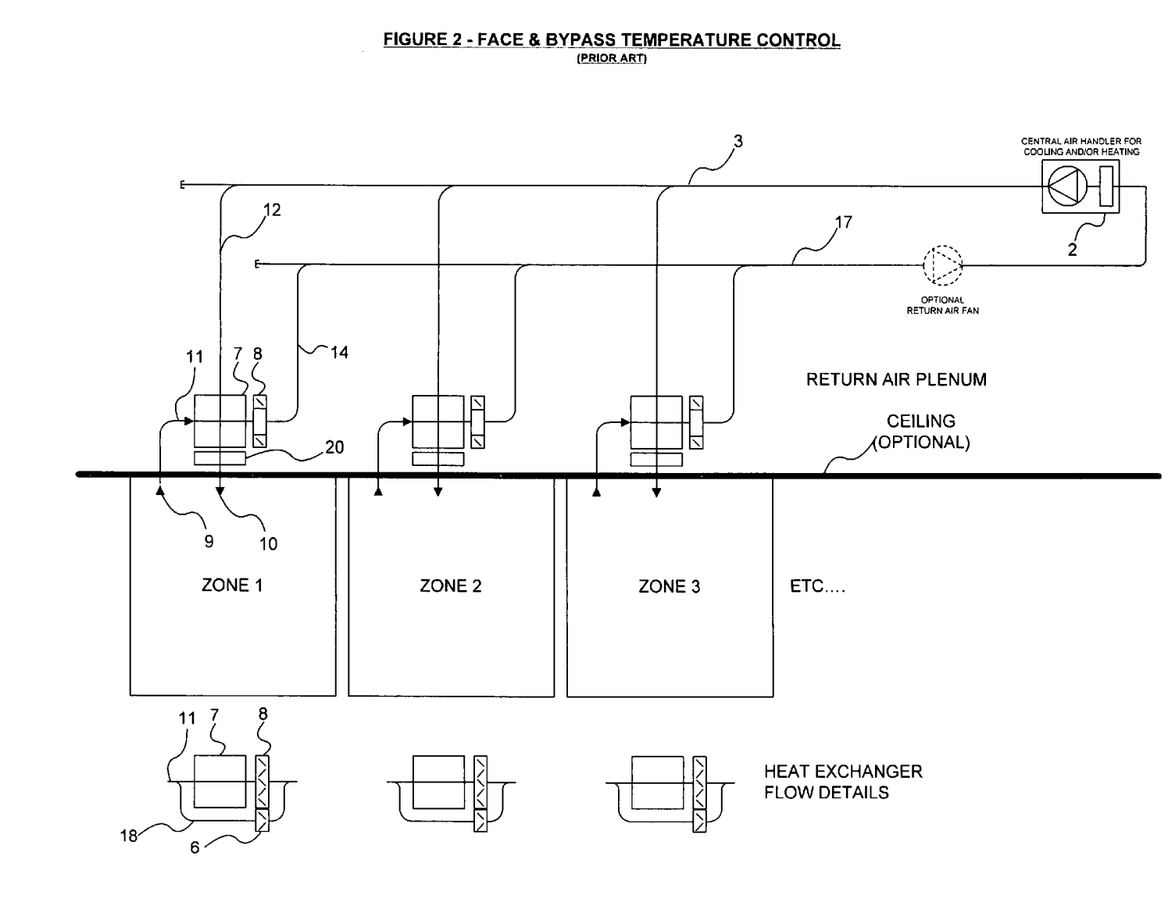
FIG. 2 is a prior art air flow diagram of a system generally disclosed in air handling systems, such as, for example, in U.S. Pat. No. 6,789,618 of Pearson.

FIG. 2 is a prior art airflow diagram of a system such as described generally, for example, in U.S. Pat. No. 6,789,618 B2 of Pearson with a face damper to regulate the volume of air passing through each heat exchanger in the system for maintaining zone temperature and a bypass damper to route excess return air to the return duct. Return air to heat exchanger is either free-flow or directly connected. Return air leaving heat exchanger and face damper is directly connected to return air duct.

OBJECTS OF THE INVENTION

It is an object of the invention to provide energy-efficient temperature and humidity control with uniform ventilation air distribution in a constant-volume zoned heating and cooling system.

It is also an object to regulate the temperature of supply air to a space, using the temperature differential between supply air and return (room) air and regulating the flow of return air through a heat exchanger.

Other objects which become apparent from the following description of the present invention.

SUMMARY OF THE INVENTION

This invention is a system and method for providing accurate temperature and humidity control in a multi-zone building with varying space cooling and heating loads while maintaining a continuous and fixed supply of total air and ventilation air with high efficiency. The system is referred to by the trade name CAVVAT™.

This invention uses an air-to-air heat exchanger that regulates the temperature of the supply air of an airstream to a zone by using the temperature differential between supply air and return (room or zone) air and also regulating the flow of return air of the air stream through the heat exchanger. Although the effectiveness of this technique increases with the heat transfer efficiency of the heat exchanger, a wide variety of heat exchanger types and designs can be used. These include parallel flow, cross-flow, and counter-flow heat exchangers, heat pipes, and sensible heat as well as hygroscopic (Lossnay) types that are enthalpy exchange devices.

One or more dampers may be provided in the airstream. For example, a damper may be provided at an inlet of the heat exchanger or at an outlet of the heat exchanger, or elsewhere in the airstream. A damper need not be provided only at the inlet or outlet; it can be provided downstream or upstream thereof.

Two different system embodiments are identified in this invention. The first one employs a single centralized return air blower or fan to pull return air through a controlled variable air volume face damper at the outlet of each heat exchanger in each zone. The first of these embodiments routes the excess return air in each zone (that which is not routed through the heat exchanger) to at-least-one pressure bypass-relief damper on the return air duct through free-flowing or direct ducting. The purpose of the at least one bypass-relief damper is to create constant negative pressure at the face damper that allows a full range of flow conditions. As the face dampers on the zones close, the relief-bypass opens to route more air to the return to maintain constant volume. The purpose of the bypass-relief damper is to create constant negative pressure at the face damper that allows a full range of flow conditions. As the face dampers on the zones close, the relief-bypass opens to route more air to the return to maintain constant volume. For example, the at-least-one bypass-relief damper maintains negative pressure inside the return air duct sufficient to draw air through each heat exchanger under maximum need conditions. As the face damper closes, negative pressure in the return duct increases and the at-least-one bypass-relief damper opens to allow a greater amount of bypass from the zone to the at-least-one bypass-relief damper. The centralized return air blower handles a constant return air volume through the return air duct connected to all zone heat exchangers and at-least-one bypass-relief damper.

The second embodiments use a self-contained zone configuration wherein each zone has its own variable air volume return air blower or fan pulling air out of its local heat exchanger. The controllable return air blowers in each zone replace the variable air volume dampers of the first embodiment. It is possible to eliminate the need for extended return air ducting air from the heat exchangers to the centralized return air blower. Air leaving the fan at each unit can be simply spilled into the ceiling plenum and returned free-flow to the central blower along with any bypass air that is also spilled into the ceiling plenum, although it is advantageous in many cases to maintain a directly ducted path.

In variations of the second embodiment, a system is provided with modulating zone fan to regular airflow through the zone heat exchanger. Excess air is routed via free-flow or direct connection to the return duct.

In yet another variation of the second embodiment, a system is provided with modulating zone fan to regulate airflow through the zone heat exchanger. Excess air is routed via free-flow or direct connection to a zone bypass relief damper fan to regulate total airflow. For example, as zone air volume through zone fan increases, the zone bypass relief damper closes, and vice versa.

In still another variation of the second embodiment, a system is provided with a modulating zone fan to regulate airflow through the zone heat exchanger. Excess air is routed via free-flow to a system bypass relief damper in the return airflow to return duct. System bypass relief damper operates in unison with system face damper and zone fans to regulate total airflow. For example, as total combined air volume through all zone fans increase, the system bypass relief damper closes, the system face damper opens, and vice versa.

In another variation of the second embodiment, a system is also provided with a modulating zone fan to regulate airflow through the zone heat exchanger. Excess air is routed via free-flow to a zone bypass relief damper in the return airflow to return duct. Zone bypass relief damper operates in unison with face damper and zone fans to regulate total airflow. For example, as zone air volume through zone fan increases, the zone bypass relief damper closes, and the zone face damper opens, and vice versa.

Furthermore, in still another alternate variation of the second embodiment, a system is provided with a modulating zone fan to regulate airflow through the zone heat exchanger. Excess is routed via free-flow to a system bypass relief damper in the return airflow to return duct. System bypass relief damper operates in unison with zone face dampers and zone fans to regulate total airflow. For example, as total combined air volume through all zone fans increase, the system bypass relief damper closes, the zone face dampers opens, and vice versa.

In all embodiments of the invention a heating device may be added at the exit of the heat exchanger before air is introduced to the zone. This heating device would be available to provide auxiliary heat when the system is in the cooling mode and full flow through the heat exchanger face damper is insufficient to avoid over-cooling the zone. The heating device could also be the primary or secondary form of heat when the system has switched to the heating mode.

BRIEF DESCRIPTION OF THE DRAWINGS

The present invention can best be understood in connection with the accompanying drawings. It is noted that the invention is not limited to the precise embodiments shown in drawings, in which.

DETAILED DESCRIPTION OF THE INVENTION

With the CAVVAT™ systems of this invention it is possible to have condensation in the heat exchanger during morning startup when the room dew-point temperature may be higher than the cold supply air temperature. This condensation can be adequately handled in a number of ways. Most directly, a drain connection can be provided and piped to a nearby drain. The use of a hygroscopic or Lossnay style heat exchanger will simply allow the moisture to pass through to the supply airstream. Another method of dealing with condensate is to use a hygroscopic coating on the interior surface of a metal heat exchanger which will allow the condensed moisture to be spread over a wide area permitting its evaporation into the return air stream. Yet another method is to place moisture absorbing material (such as sponge) at the point where condensate collects to absorb this limited amount of startup moisture; when the dew point drops, this moisture will evaporate into the return airstream.

Figure 1:
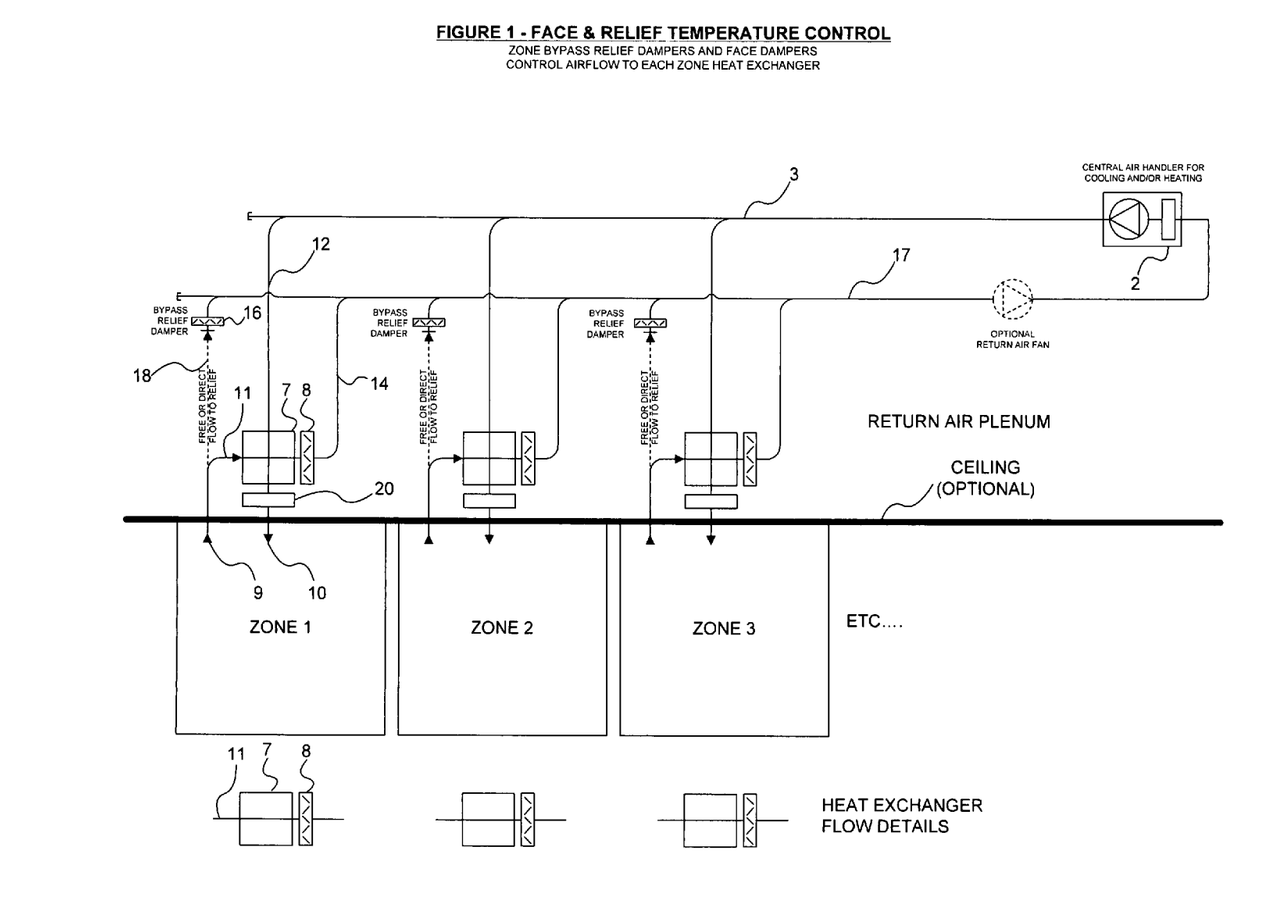
FIG. 1 is an airflow diagram of a first embodiment CAVVAT™ system of this invention with a face damper to regulate the volume of air passing through each heat exchanger in the system for maintaining zone temperature and at-least-one bypass-relief damper in the return duct to accept excess return air and maintain a constant negative pressure at the outlet of each face damper. Return air to heat exchanger and to at-least-one bypass-relief damper is either free-flow or directly connected. Return air leaving heat exchanger and face damper is directly connected to return air duct.
Figure 3:
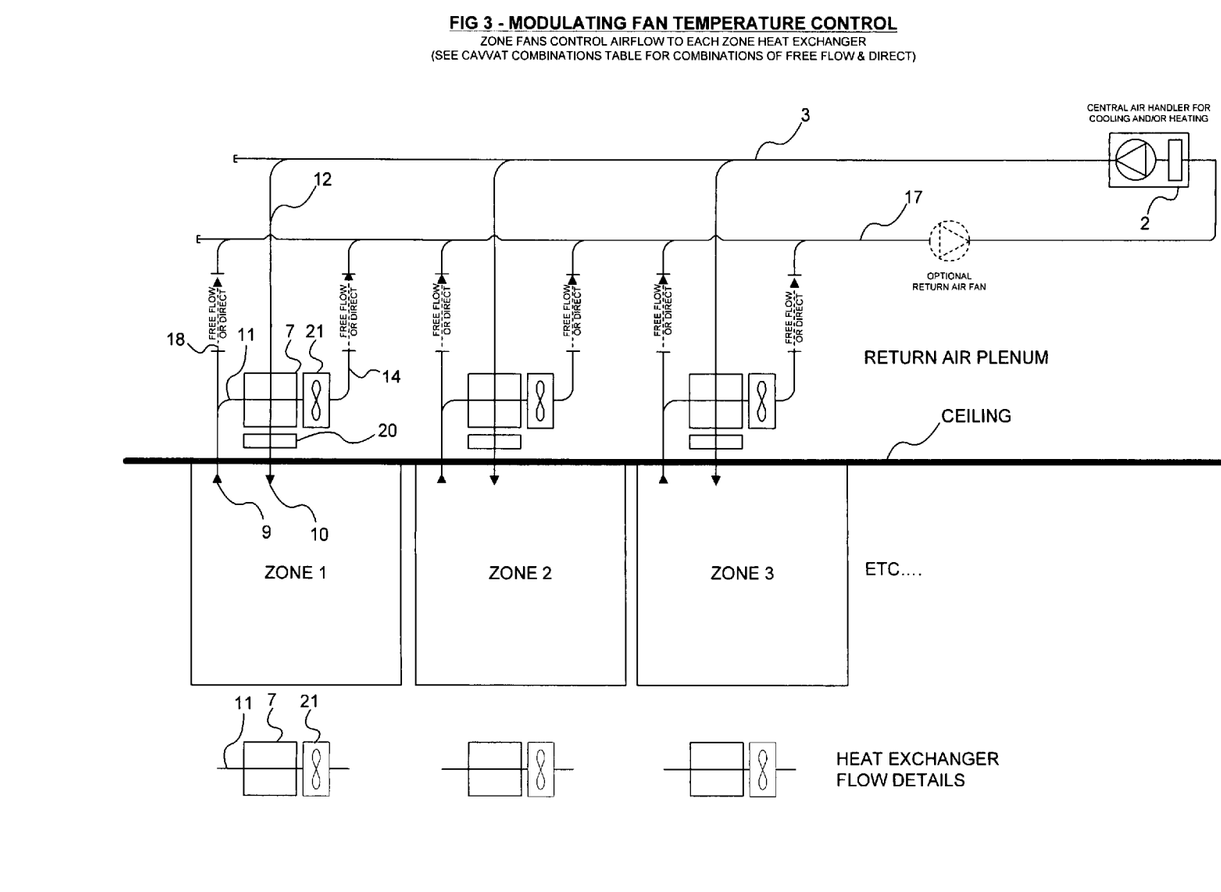
FIG. 3 is an airflow diagram of a second embodiment CAVVAT™ system of this invention with a modulating fan to regulate the volume of air passing through each heat exchanger in the system for maintaining zone temperature. Return air leaving heat exchanger and modulating fan can be either free-flow or directly ducted. Return air to heat exchanger is directly connected to avoid drawing in cold air that may be spilling from adjacent zones. This system can reduce the requirement for lengthy return air ducts. A ceiling plenum is necessary here to prevent cold return air from falling into the zone.

FIGS. 1 and 3 illustrate two different embodiments of the CAVVAT™ system of this invention, with FIGS. 3a-3e representing variations of the embodiment of FIG. 3. The common elements of each embodiment include the following features and items. A constant volume central air handling unit 2, that delivers air at a controlled dew point temperature to ensure desirable zone humidity, is used with a constant air volume supply air duct 3 ducted 12 to each heat exchanger 7 in each zone (three illustrated) and distributing supply air at output 10 to each zone. Return air enters ceiling input 9, a variable amount enters heat exchanger 7 at airstream 11, and the excess return air 18 is routed to the return in one of three methods outlined in FIGS. 1-3. An optional return air fan may be used to reduce static pressure on the central air handler. Additional heating can be accomplished using an optional heating device 20.

Figure 1A:
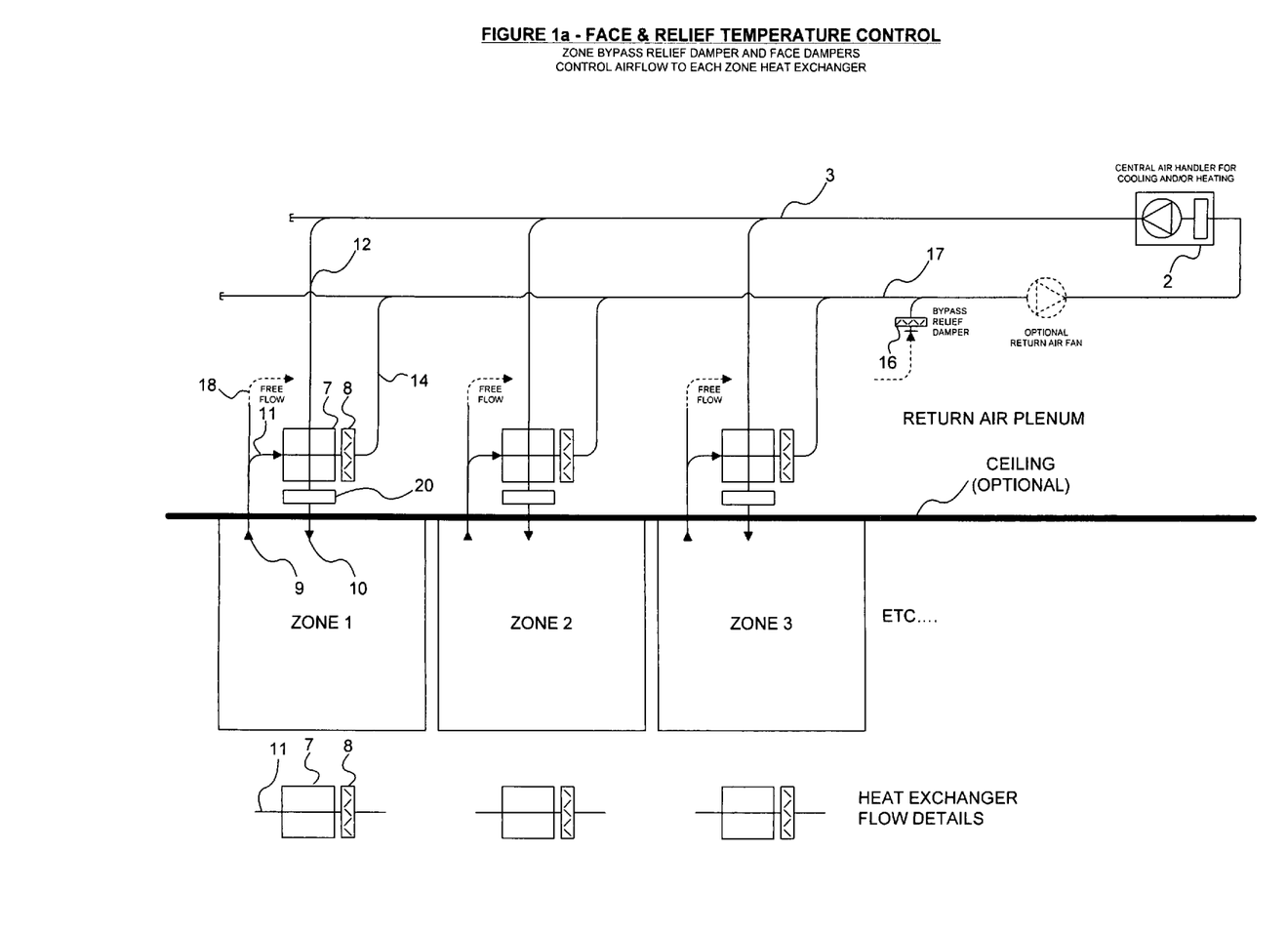
FIG. 1a is an airflow diagram similar to the airflow diagram of FIG. 1, except that return air to heat exchanger and to at least one bypass relief damper is free-flow.

FIG. 1 uses centralized return from a constant air volume blower in central air handler 2 to draw return air through variable air volume face damper 8 in each zone at the return air outlet of each heat exchanger 7 using return duct 17. It is face damper 8 that is controlled to adjust the air temperature of each zone. Excess return air exits input 9 in each zone and is directly ducted or drawn into the ceiling plenum and returned as variable stream 18 to at-least-one bypass-relief damper 16 and then onto central air handler 2. FIG. 1a is an airflow diagram similar to the airflow diagram of FIG. 1, except that return air to heat exchanger and to at least one bypass relief damper is free-flow.

FIG. 3 uses centralized return from a constant air volume blower in central air handler 2 to draw return air through input 9 and variable volume fan 21 with a direct connection between input 9 and heat exchange airstream 11 with bypass air 18 continuing on to the ceiling plenum and a modulating fan 21 at the outlet of each heat exchanger 7 to draw a variable amount of air across the heat exchanger 7 for zone temperature control before being discharged via outlet 14 into the ceiling plenum (or via direct ducting) and then onto central air handler 2.

While FIG. 1 shows damper 8 located at an outlet of each heat exchanger 7, it is noted that alternatively damper 8 can be located at an inlet of heat exchanger 7, or damper 8 can be located elsewhere upstream or downstream of heat exchanger 7, or combinations thereof.

Likewise, while FIG. 3 shows variable volume fan 21 located at the outlet of heat exchanger 21, it is noted that it can also be located at an inlet to heat exchanger 7, or elsewhere upstream or downstream of heat exchanger 7, or combinations thereof.

Figure 3A:
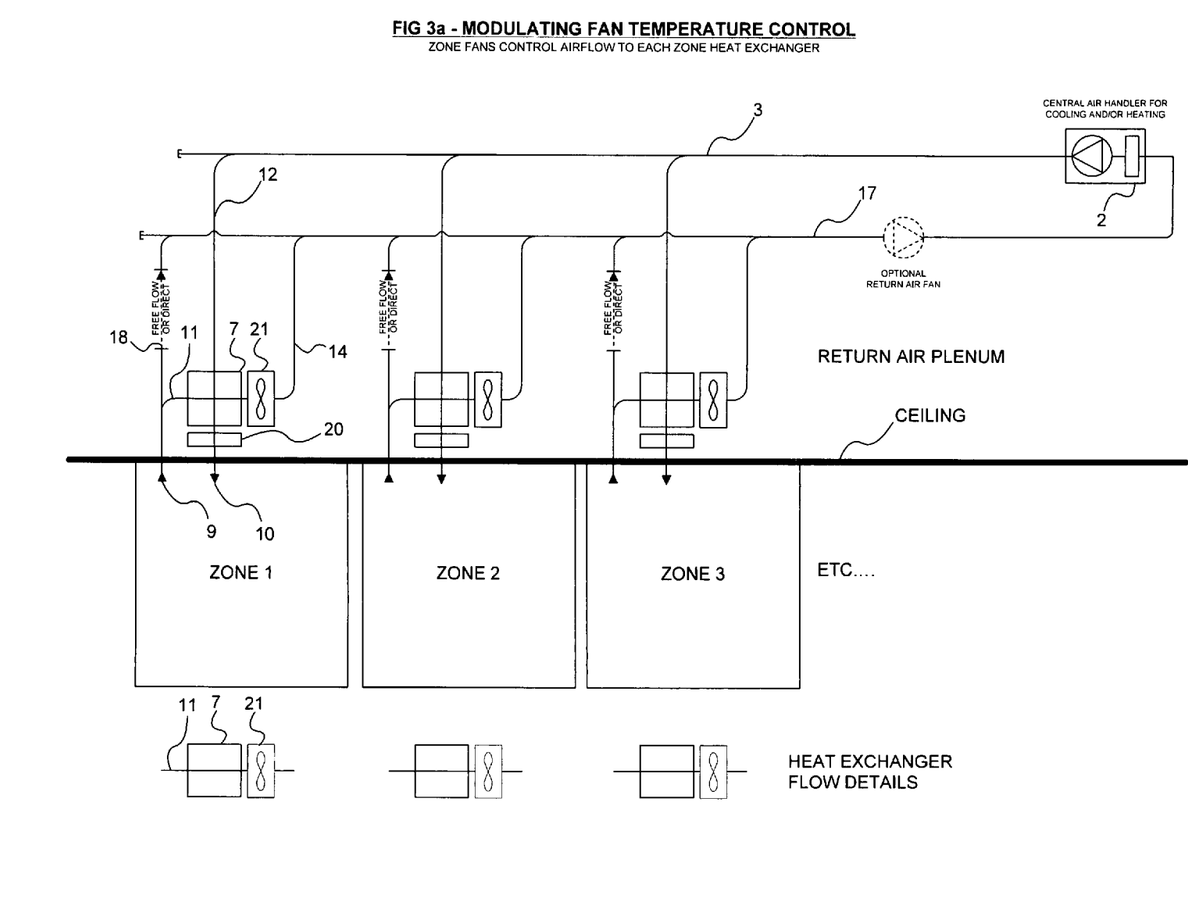
FIG. 3a is an airflow diagram of a variation of the embodiment of FIG. 3 with a modulating fan, with direct ducting to the main return duct.

Drawing FIG. 3a depicts a system with modulating zone fan (21) to regulate airflow through the zone heat exchanger (7). Excess air (18) is routed via free-flow or direct connection to the return duct (17).

Figure 3B:
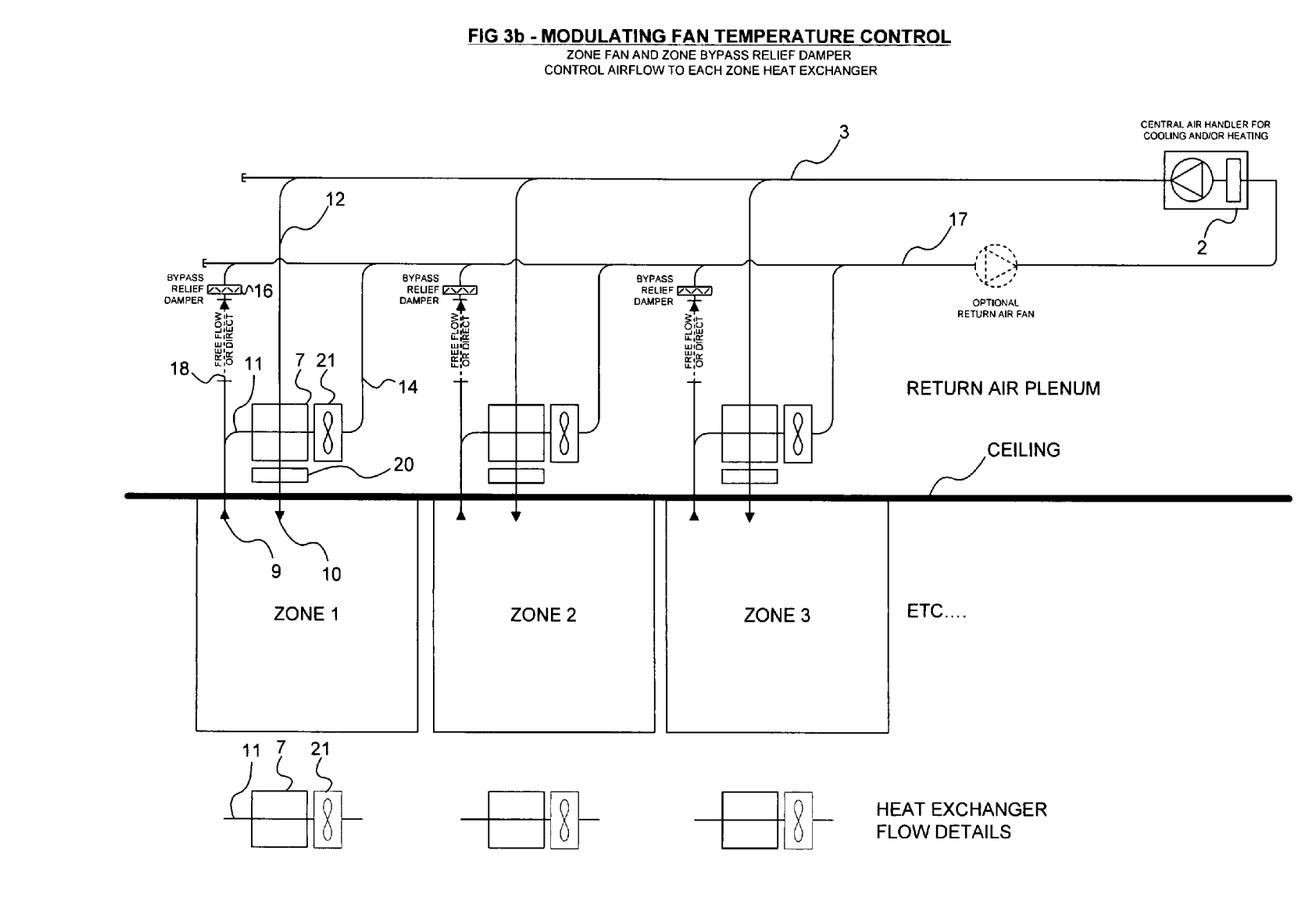
FIG. 3b is an airflow diagram of an another variation of the embodiment of FIG. 3 with a modulating fan using a bypass relief damper in the return air flow to regulate total airflow.

Drawing FIG. 3b depicts a system with modulating zone fan (21) to regulate airflow through the zone heat exchanger (7). Excess air (18) is routed via free-flow or direct connection to a zone bypass relief damper (16) in the return airflow to return duct (17). Zone bypass relief damper operates in unison with zone fan (21) to regulate total airflow. For example, as zone air volume through zone fan (21) increases, the zone bypass relief damper (16) closes, and vice versa.

Figure 3C:
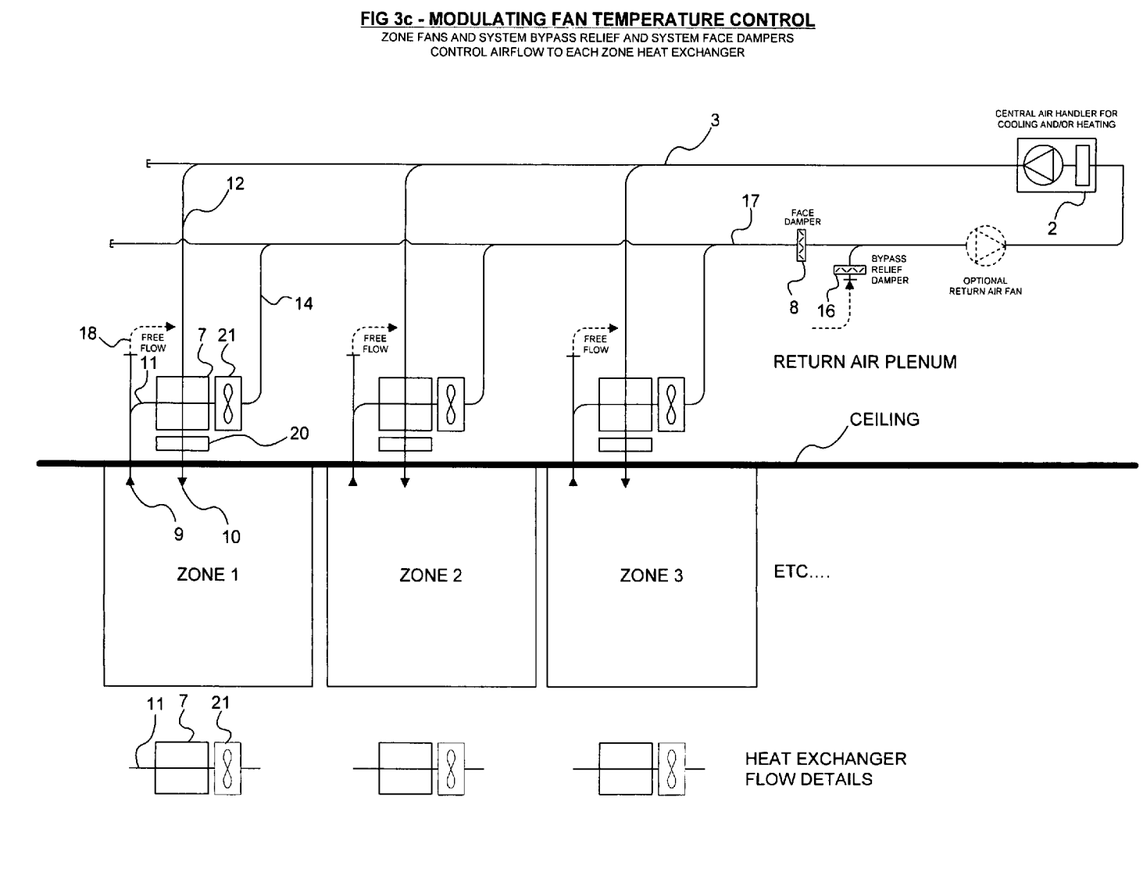
FIG. 3c is an airflow diagram of another variation of the embodiment of FIG. 3 of a system using individual modulating zone fans with a bypass relief and a system face damper in the main return air duct to maintain constant air volume and zone temperature control.

Drawing FIG. 3c depicts a system with a modulating zone fan (21) to regulate airflow through the zone heat exchanger (7). Excess air (18) is routed via free-flow to a system bypass relief damper (16) in the return airflow to return duct (17). System bypass relief damper (16) operates in unison with system face damper (8) and zone fans (21) to regulate total airflow. For example, as total combined air volume through all zone fans (21) increase, the system bypass relief damper (16) closes, the system face damper opens, and vice versa.

Figure 3D:
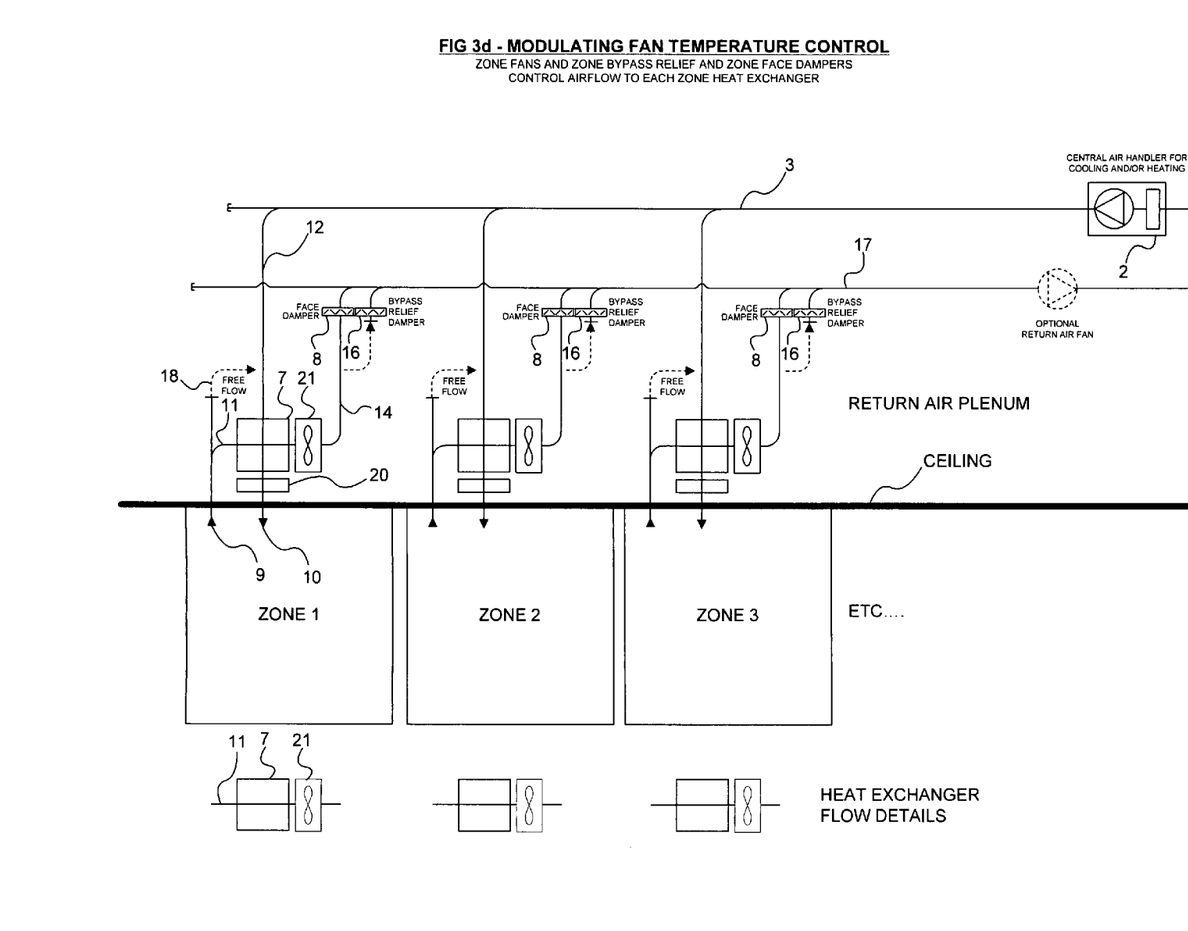
FIG. 3d is an airflow diagram of another variation of the embodiment of FIG. 3 with modulating fans and bypass relief dampers at each zone to regulate air flow through a zone heat exchanger.

Drawing FIG. 3d depicts a system with a modulating zone fan (21) to regulate airflow through the zone heat exchanger (7). Excess air (18) is routed via free-flow to a zone bypass relief damper (16) in the return airflow to return duct (17). Zone bypass relief damper (16) operates in unison with face damper (8) and zone fans (21) to regulate total airflow. For example, as zone air volume through zone fan (21) increases, the zone bypass relief damper (16) closes, and the zone face damper opens, and vice versa.

Figure 3E:
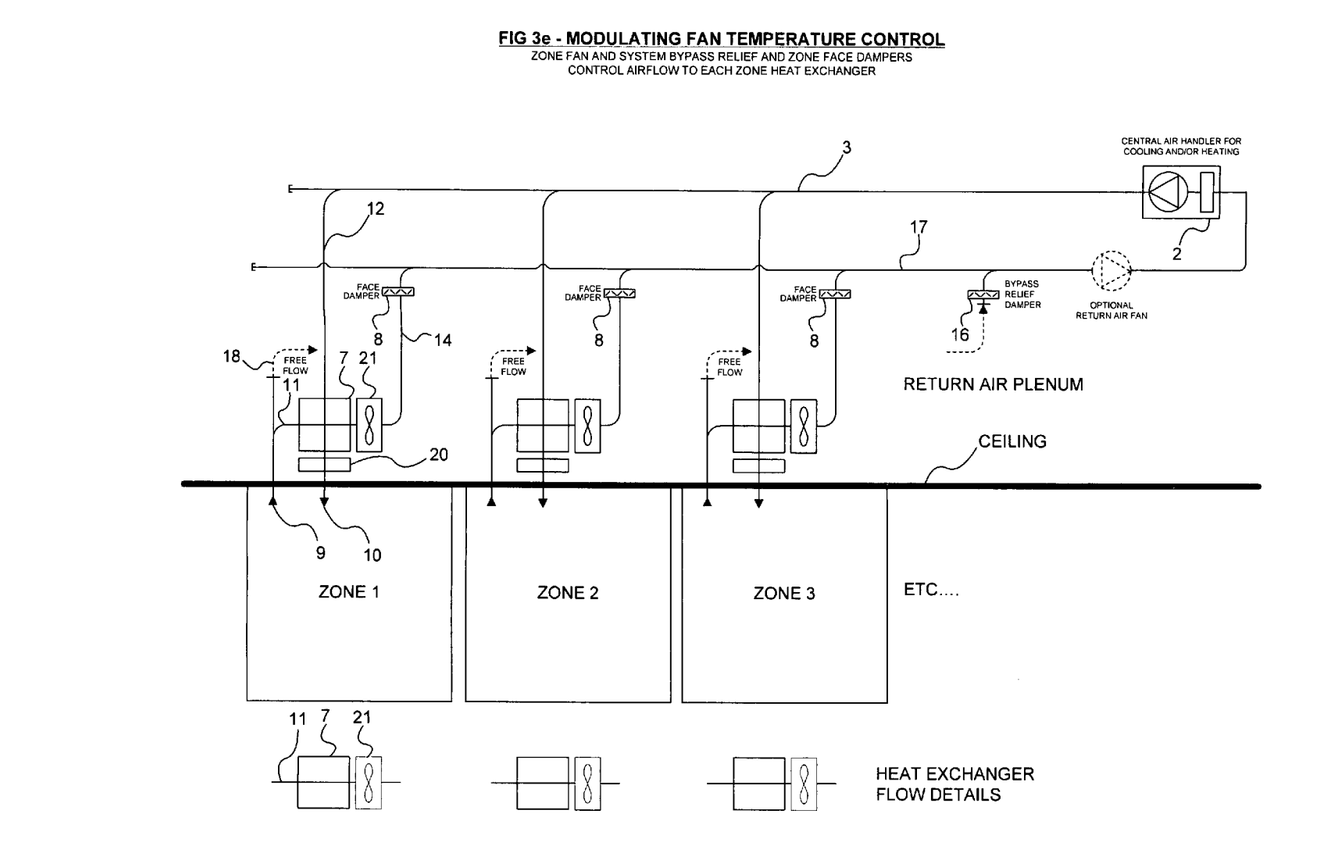
FIG. 3e is another air flow diagram of another variation of the embodiment of FIG. 3 using modulating zone fans with outlet face dampers at each zone with a single system bypass relief face damper from the return air plenum for bypass air from all zones bypass relief damper to regulate airflow through a heat exchanger.

Drawing FIG. 3e depicts a system with a modulating zone fan (21) to regulate airflow through the zone heat exchanger (7). Excess air (18) is routed via free-flow to a system bypass relief damper (16) in the return airflow to return duct (17). System bypass relief damper (16) operates in unison with zone face dampers (8) and zone fans (21) to regulate total airflow. For example, as total combined air volume through all zone fans (21) increase, the system bypass relief damper (16) closes, the zone face dampers opens, and vice versa.

Figure 4:
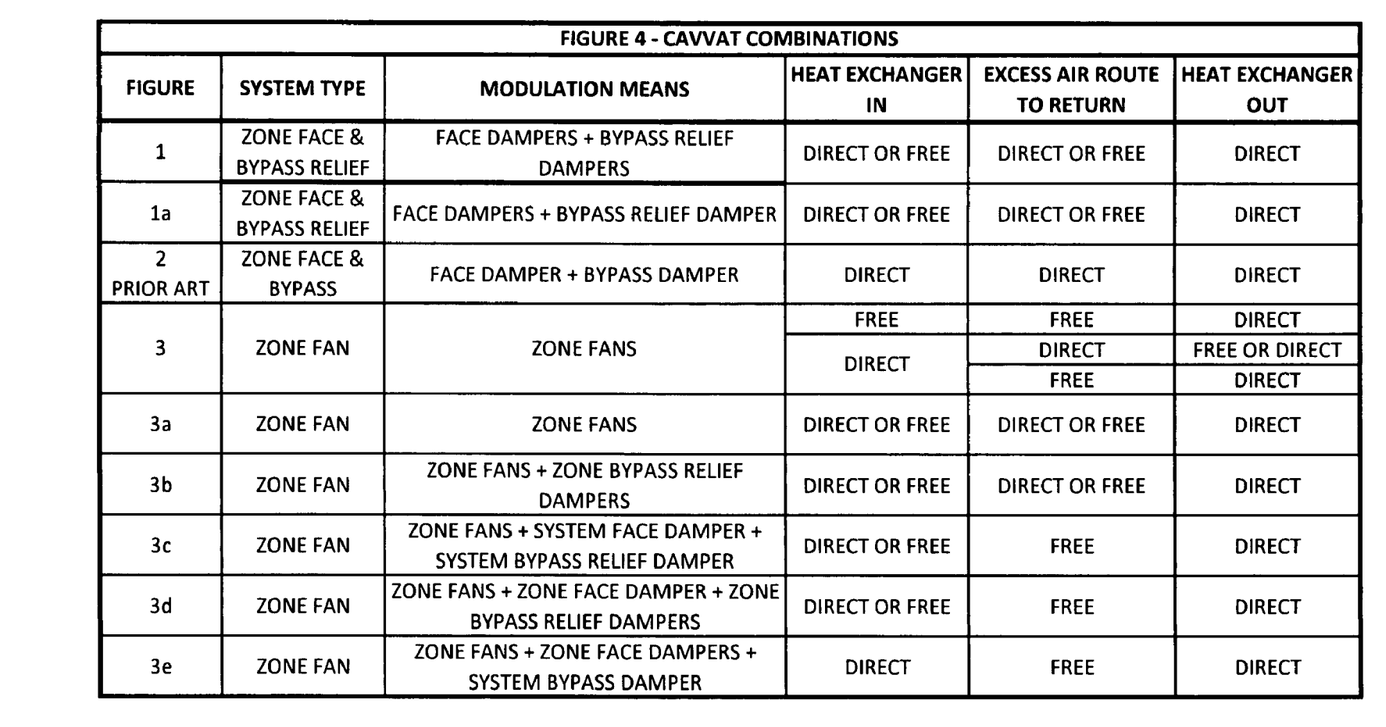
FIG. 4 is a table showing the embodiments and various options of each.

FIG. 4 shows the various combinations that are used in CAVVAT™ systems.

Figure 5:
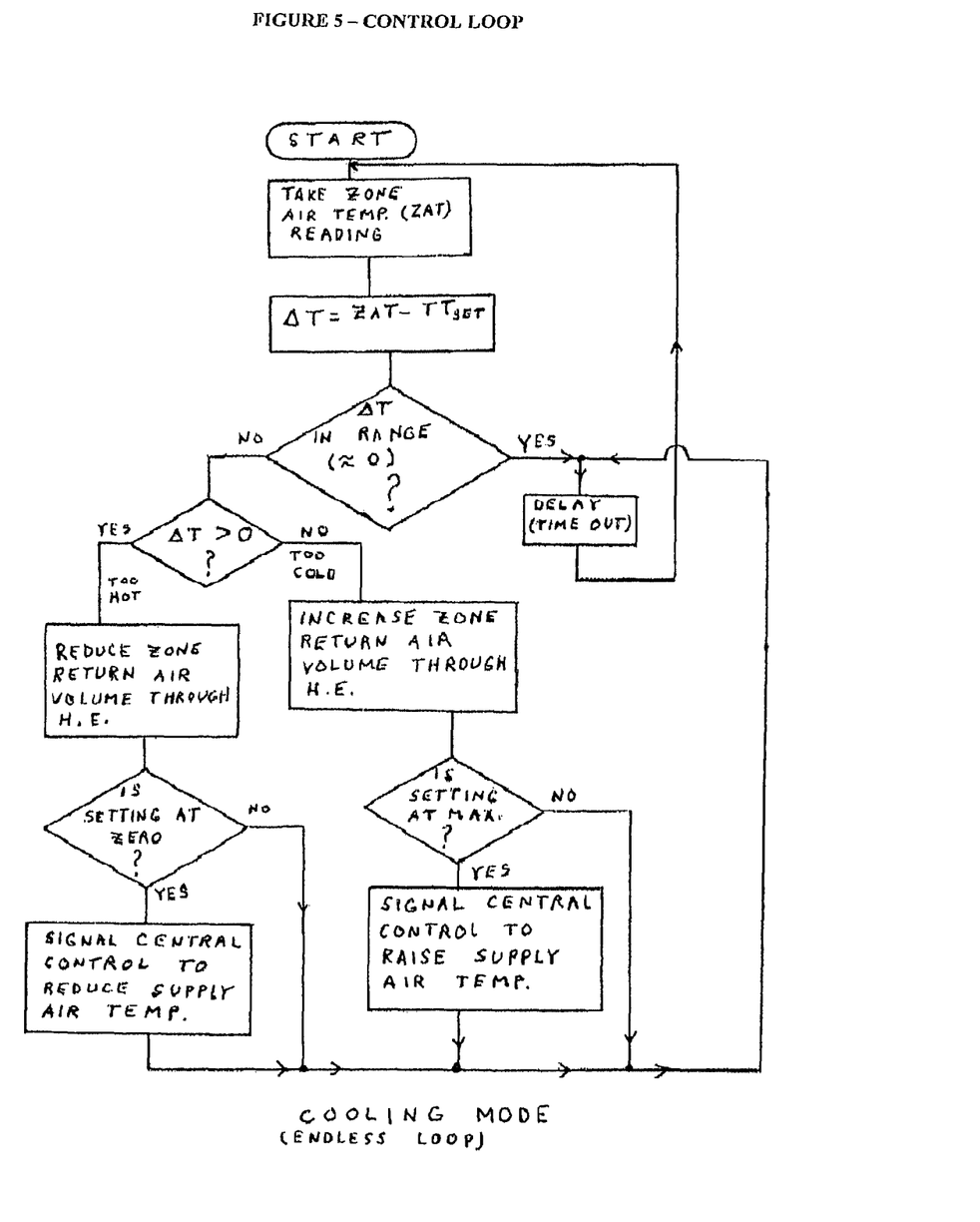
FIG. 5 is a flow chart showing a cooling mode control flow method for a CAVVAT™ system of this invention.

FIG. 5 illustrates a possible control loop for the cooling mode of operation. Other similar control loops can be used as well as long as the basic method of zone temperature control by regulating the rooms return air volume through the heat exchanger is followed. The flow chart of FIG. 5 is compatible with all three embodiments of CAVVAT™ systems of this invention.

In FIG. 5, after starting the endless control loop, the air temperature of the zone (ZAT) is measured. Then it is compared with the thermostat setting thereby calculating "delta T"($\Delta T$). If the temperature is within the pass band of the desired temperature, a short delay of the same order as the thermometer is taken and then the flow is again started at the top. If delta T($\Delta T$) is positive, the zone is too hot, therefore the zone return air volume is reduced through the heat exchanger; this might involve reducing flow through an adjustable damper or reducing the speed of the self-contained blower in the zone. If the setting were at zero flow of return air through the heat exchanger, the central air handling unit is signaled to reduce supply air temperature. If delta T($\Delta T$) were negative, this would indicate a zone that is too cold. Thus the return air volume through the zone heat exchanger would then be increased. If the setting were at max, the central air handling unit would be signaled to raise supply air temperature.

Also with respect to FIG. 5, the same flow can be used with minor changes to represent a heating mode. Namely, the delta T ($\Delta T$) greater than zero decision block is changed to less than zero, "too hot" and "too cold" comments are reversed and "raise" or "reduce" temperature are also switched. The amount of air volume change every time through the loop can be a fixed increment, an increment based on "delta T" ($\Delta T$), or the result of a complex algorithm based on several parameters. The control operations can be analog or digital.

In the foregoing description, certain terms and visual depictions are illustrative only: However, no unnecessary limitations are to be construed by the terms used or illustrations depicted, beyond what is shown in the prior art, since the terms and illustrations are exemplary only and are not meant to limit the scope of the present invention.

It is further noted that other modifications may be made to the present invention, without departing from the scope of the invention, as noted in the appended claims.

I claim:

1. A constant air volume heating and cooling control system in a multiple zoned building comprising:
    each zone having an output for supplying conditioned air to said zone and an input for receiving return air from said zone;
    a constant volume central air handling unit for delivering air at a controlled dew point temperature to ensure desirable zone humidity through a constant air volume supply air duct to all of said zones;
    a return air duct for delivering return air from all of said zones to said central air handling unit;
    a heat exchanger for each zone for exchanging heat between air from said central air handling unit to said output and a variable amount of return air from each input to said return air duct;
    an air flow bypass for excess return air from the inlet of each zone to said return duct; and, a zone modulating fan downstream of each said heat exchanger having an exhaust duct leading to said return duct for regulating airflow through said heat exchanger for each zone to produce said variable amount of return air and maintaining said constant volume of air.

2. The control system of claim 1 in which each said air flow bypass for excess air contains a zone bypass relief damper, said relief damper operating in unison with said zone modulating fan in each zone, whereby said bypass relief damper opens or closes to compensate for changing air volume through said zone modulating fan so that constant air flow volume in and out of each zone is maintained.

3. The control system of claim 1 in which said return air duct has a face damper for controlling airflow from all of said zones, and the air flow bypasses from all of said zones combining to pass through a bypass relief damper before entering said return air duct, exiting air from said bypass relief damper entering said return air duct downstream of said face damper on the way to an inlet to said central air handling unit, said system bypass relief damper operating in unison with said system face damper and said zone modulating fans to regulate total airflow through said zones, wherein airflow is constant to and from each said zone, so that within each said zone the airflow to and from is constant.

4. The control system of claim 1 in which the exhaust duct for each zone modulating fan contains a face damper and at least one bypass relief damper for operating in conjunction with said zone modulating fan to regulate airflow through said heat exchanger and maintain constant flow in each zone, and excess air from each zone passing through said at least one bypass relief damper, whereby all of said zone modulating fan, said face dampers, and said at least one bypass relief dampers operate in unison to maintain a constant air flow volume through all of said zones and through the system.

5. The control system of claim 1 in which the exhaust duct of each said zone modulating fan contains a face damper before air is exhausted into said return air duct, and excess air flow bypasses from all outlets of said zones combine to pass through a bypass relief damper before entering said return air duct downstream of where air from said face dampers enters said return air duct, said zone modulating fans, said bypass relief damper, and said face dampers are operated in unison to regulate total airflow in said system, whereby said bypass relief damper and said zone face dampers are operated to compensate for changes in total combined air volume through all of said zone modulating fans.

6. The control system of claim 1 in which said zone heat exchangers are in a return air plenum above a ceiling in each zone.

\* \* \* \* \*